United States Patent
Cho et al.

(10) Patent No.: US 7,929,963 B2
(45) Date of Patent: Apr. 19, 2011

(54) COGNITIVE RADIO BASED AIR INTERFACE METHOD IN WIRELESS COMMUNICATION SYSTEM

(75) Inventors: Dong Ho Cho, Daejeon (KR); Ho Won Lee, Daejeon (KR); Chi Sung Bae, Daejeon (KR); Woong Sup Lee, Daejeon (KR)

(73) Assignee: Korean Advanced Institute of Science and Technology, Daejeon (KR)

( * ) Notice: Subject to any disclaimer, the term of this patent is extended or adjusted under 35 U.S.C. 154(b) by 840 days.

(21) Appl. No.: 11/981,826

(22) Filed: Oct. 30, 2007

(65) Prior Publication Data

US 2008/0192686 A1 Aug. 14, 2008

Related U.S. Application Data

(63) Continuation-in-part of application No. PCT/KR2007/000711, filed on Feb. 9, 2007.

(30) Foreign Application Priority Data

Feb. 8, 2007 (KR) .................. 10-2007-0012994

(51) Int. Cl.
*H04W 4/00* (2009.01)
(52) U.S. Cl. .................. 455/424; 455/452.1; 455/426.1; 370/338

(58) Field of Classification Search ............... 455/422.1, 455/424, 426.1, 452.1, 560; 370/338, 328
See application file for complete search history.

(56) References Cited

U.S. PATENT DOCUMENTS 7,313,393 B2 * 12/2007 Chitrapu ................. 455/425
7,349,699 B1 * 3/2008 Kelly et al. .............. 455/444

* cited by examiner

*Primary Examiner* — Kamran Afshar
(74) *Attorney, Agent, or Firm* — Kevin D. Jablonski; Graybeal Jackson LLP

(57) ABSTRACT

A cognitive radio-based wireless communication system and an air interface method in a physical layer and a data link layer, which constitute a cognitive radio-based next-generation wireless communication system. The air interface method for wireless communication in the cognitive radio-based wireless communication system of the present invention is provided in the cognitive radio-based wireless communication system including a base station system and a plurality of mobile station systems. The base station system and a certain mobile station system communicate with each other using an overlay method that uses a spectrum hole. The base station system and the mobile station system switch from the overlay method to an underlay method to communicate with each other when a paying user having high priority performs communication using the spectrum hole.

20 Claims, 8 Drawing Sheets

«COGNITIVE RADIO BASED AIR INTERFACE METHOD IN WIRELESS COMMUNICATION SYSTEM»

This is a continuation-in-part application which claims priority from PCT/KR2007/000711, filed 9 Feb. 2007, based on Korean patent Application No. 2007-0012994, filed 8 Feb. 2007, which are incorporated herein by reference.

TECHNICAL FIELD

The present invention relates, in general, to a cognitive radio-based mobile communication system and, more particularly, to an air interface method that is implemented in a physical layer (PHY) and a data link layer (a Medium Access Control [MAC]/Radio Link Control [RLC] layer and a Radio Resource Management [RRM] layer), which constitute a cognitive radio-based next-generation wireless communication system.

BACKGROUND ART

Wireless communication technologies are very extensively used in daily life, and various types of wireless communication technologies have rapidly developed. Data other than voice information can currently be transferred using third generation radio communication technology, such as International Mobile Telecommunications (IMT) 2000, which followed Code Division Multiple Access (CDMA) communication technology, designated second generation technology. Recently, technology for providing data at a higher rate and at lower cost through next-generation wireless communication systems, such as Wireless Broadband (Wibro) technology, has been developed.

A newly developed wireless communication system is allocated and uses a frequency band which is not used with existing technology due to the problem of coexistence with existing technology. Due to the current development of various types of wireless communication systems, most frequencies in a band of several gigahertz (GH) have already been allocated, and thus few available frequencies remain.

In order to solve the problem, J. Mitola proposed Cognitive Radio (CR) technology, which is radio technology for sensing surrounding environments and determining radio transmission parameters, such as frequency, a modulation method, and power, and which automatically finds an available frequency according to region and time and thus enables desired communication without harming other licensed radio stations in the area.

Such cognitive radio technology has been popularized as technology for increasing the efficiency of utilization of frequency resources in the present situation, in which frequency resources are exhausted due to the increase in demand for wireless communication.

Cognitive radio-based next-generation wireless communication protocols include a physical layer (PHY), which is a first layer, and a data link layer, which is a second layer, the data link layer being classified into a Medium Access Control (MAC)/Radio Link Control (RLC) layer and a Radio Resource Management (RRM) layer.

The physical layer, the first layer, is a layer for transmitting/receiving signals between a base station and a mobile station or between mobile stations through communication channels. The signal transmission/reception methods of the physical layer include an overlay transmission method, an underlay transmission method, and a cooperative transmission method.

The overlay transmission method is a method of searching the entire frequency spectrum for an available spectrum hole and transmitting data at the frequency of the found spectrum hole, as shown in FIG. 1. The underlay transmission method is a method of transmitting signals in a wide frequency band so that the power level of the signals is not greater than a noise level, as shown in FIG. 2. The cooperative transmission method is a method of transmitting/receiving data in cooperation with neighboring terminals as well as a given terminal when the given terminal communicates with a base station.

The MAC/RLC layer is a layer for designing the format of a MAC frame. Generally, a MAC frame format in a wireless communication system is configured on the basis of a single spectrum. The location of data transmitted in a single spectrum within a MAC frame is detected using control information contained in the MAC frame. A user can check the control information and can determine which portion of a physical layer (PHY) frame is being used to transmit the data thereof. Further, in order to transmit/receive data using two or more different types of spectra, all system modules using respective spectra must be provided. When a single system module is provided, only information about a single MAC and a single PHY can be detected, and thus data can be transmitted or received using only a single spectrum.

The RRM layer allocates available spectrum holes to users in the sequence of the users' requests while detecting spectrum holes.

The operations of respective layers constituting the above-described cognitive radio-based next-generation wireless communication system have the following problems.

In the case of a physical layer (PHY), signals are transmitted or received using either an overlay transmission method or an underlay transmission method, but not both. Each of these transmission methods has its own unique problems. That is, the overlay transmission method is problematic in that, when a paying user appears during communication using a spectrum hole, the overlay transmission method must interrupt the communication using the spectrum hole, so that communication is frequently interrupted. The underlay transmission method is problematic in that, since the distance over which communication is performed must be as short as possible, communication is impossible if a terminal moves far away from a base station. Further, the cooperative transmission method is problematic in that, since a base station must manage the cooperative transmission time and transmission power of each terminal, the signaling overhead and complexity of the base station are increased.

In the case of the MAC/RLC layer, the format of a MAC frame is closely related to the frequency band and frame length of a physical layer. In an existing wireless communication system, a single MAC layer corresponds to a single physical layer. In contrast, in the cognitive radio-based next-generation wireless communication system, a single integrated MAC must manage a plurality of physical layers so as to maximize transmission efficiency. Further, since the usable frequency band of the cognitive radio-based system and the duration of a spectrum hole are variable, MAC must collectively manage the operation of a physical layer that varies with time. However, since the conventional MAC frame format is fixed, there is a problem in that it cannot support a plurality of physical layers and, in addition, a MAC frame that supports both a variable frequency band and a variable spectrum hole size cannot be configured.

FIG. 3 is a diagram showing a conventional MAC frame format. In a convention system, since a usable frequency band and the length of a single frame are preset, data symbols correspond to specific times at specific frequencies in a oneto-one manner. Further, since the conventional system uses only a single physical layer, there is no need to select a physical layer for processing a MAC Protocol Data Unit (PDU) processed by a MAC layer. However, in the cognitive radio-based wireless communication system, since the size of a usable frequency bandwidth and time are not preset, a conventional frame format having a fixed frame length and a fixed frequency band cannot be used, and there is a need to select a physical layer for processing a MAC PDU, so that the conventional frame format must be revised.

In the RRM layer, since spectrum holes are assigned according to the sequence of requests regardless of the type of service requested by users, real-time service, sensitive to delay, is frequently moved to different spectrum holes, and thus interruption may occur. Further, the RRM layer is problematic in that a spectrum hole having a long maintenance time and a large bandwidth is assigned to a user experiencing low Quality of Service (QoS), so that the spectrum may be wasted.

DISCLOSURE

Technical Problem

Accordingly, an object of the present invention proposed to solve the above problems occurring in the prior art is to provide a method of adaptively using an overlay transmission method or an underlay transmission method according to radio environment, thus increasing system capacity, providing continuous service without interruption, and satisfying target Quality Of Service (QoS).

Another object of the present invention is to provide an air interface method for wireless communication, which classifies spectrum holes according to service class and manages the classified spectrum holes, thus guaranteeing QoS experienced by users, and maximizing system performance.

Technical Solution

In order to accomplish the above object, the present invention provides an air interface method for wireless communication in a cognitive radio-based wireless communication system, the wireless communication system comprising a base station system and a plurality of mobile station systems, comprising a first step of the base station system and a certain mobile station system communicating with each other using an overlay method that uses a spectrum hole, and a second step of the base station system and the mobile station system switching from the overlay method to an underlay method to communicate with each other when a paying user having high priority performs communication using the spectrum hole.

Further, the present invention provides an air interface method for wireless communication in a cognitive radio-based wireless communication system, the wireless communication system comprising a base station system and a plurality of mobile station systems, comprising a fourth step of the base station system and a certain mobile station system communicating with each other using an underlay method, and a fifth step of the base station system and the mobile station system switching from the underlay method to an overlay method to communicate with each other when a new spectrum hole is allocated to the mobile station system.

Further, the present invention provides a base station system of a cognitive radio-based wireless communication system, comprising downstream data reception means for receiving downstream data to be transmitted to a mobile station system from a higher layer, spectrum hole information collection means for collecting information about spectrum holes from neighboring systems, channel state monitoring means for monitoring a channel state and determining whether each spectrum hole is used, overlay upstream data reception means for receiving upstream data from the mobile station system using an overlay method, underlay upstream data reception means for receiving upstream data from the mobile station system using an underlay method, resource allocation means for allocating a spectrum hole to the mobile station system using information about a usable spectrum hole obtained by the channel state monitoring means, upstream data transmission means for receiving upstream data from the overlay upstream data reception means when the spectrum hole is allocated to the mobile station system, and for receiving upstream data from the underlay upstream data reception means and transmitting the upstream data to a higher layer when no spectrum hole is allocated to the mobile station system, and downstream data transmission means for transmitting the downstream data received from the downstream data reception means to the mobile station system using an overlay method when the spectrum hole is allocated to the mobile station system, and for transmitting the downstream data received from the downstream data reception means to the mobile station system using an underlay method when no spectrum hole is allocated to the mobile station system.

In addition, the present invention provides a mobile station system of a cognitive radio-based wireless communication system, comprising downstream data reception means for receiving downstream data transmitted from a base station system using an overlay or underlay method, control information reception means for receiving control information from the base station system, upstream data reception means for receiving upstream data to be transmitted to the base station system from a higher layer, upstream data transmission means for transmitting the upstream data using the overlay method when a spectrum hole is allocated by the base station system, and for transmitting the upstream data using the underlay method when no spectrum hole is allocated by the base station system, data classification means for classifying final destinations for the downstream data received from the downstream data reception means using the control information received from the control information reception means, and downstream data transmission means for transmitting the received downstream data to a higher layer when the final destination classified by the data classification means is the mobile station system itself.

ADVANTAGEOUS EFFECTS

According to the present invention, an overlay transmission method or an underlay transmission method is adaptively used according to the radio environment, so that the system capacity can be increased, continuous service without interruption can be provided, and target QoS can be satisfied.

Further, spectrum holes are classified according to service class and are thus managed, and thus the QoS experienced by users can be guaranteed and system performance can be maximized.

BEST MODE

Hereinafter, an air interface method for wireless communication in a cognitive radio-based wireless communication system according to an embodiment of the present invention will be described in detail with reference to the attached drawings.

First, the present invention is implemented to adaptively switch between an overlay transmission method and an underlay transmission method in a physical layer. In the present specification, the terms "base station" and "mobile station" mean a base station and a mobile station that constitute a cognitive radio-based wireless communication system, as long as no particular description is given.

Figure 1:
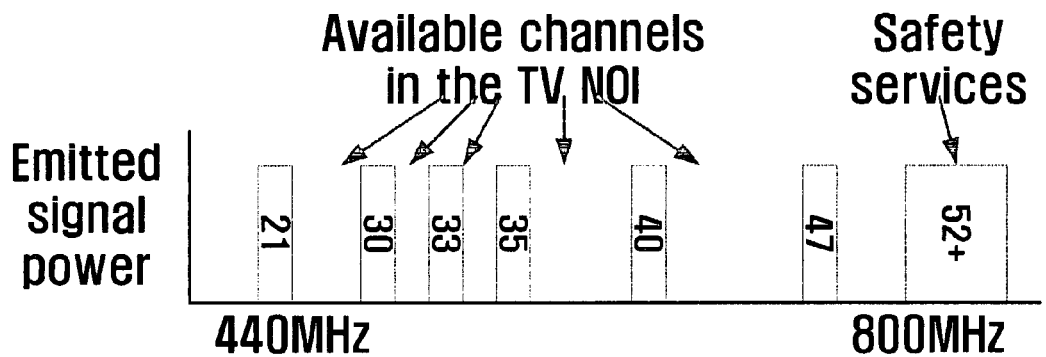
FIG. 1 is a diagram showing a typical overlay transmission method.
Figure 2:
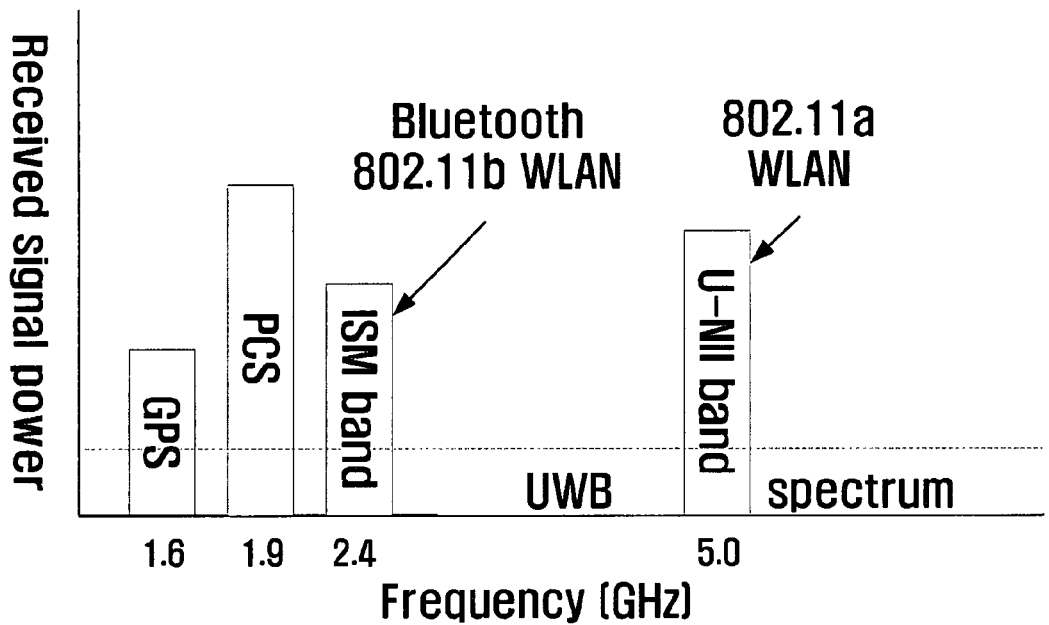
FIG. 2 is a diagram showing a typical underlay transmission method.
Figure 3:
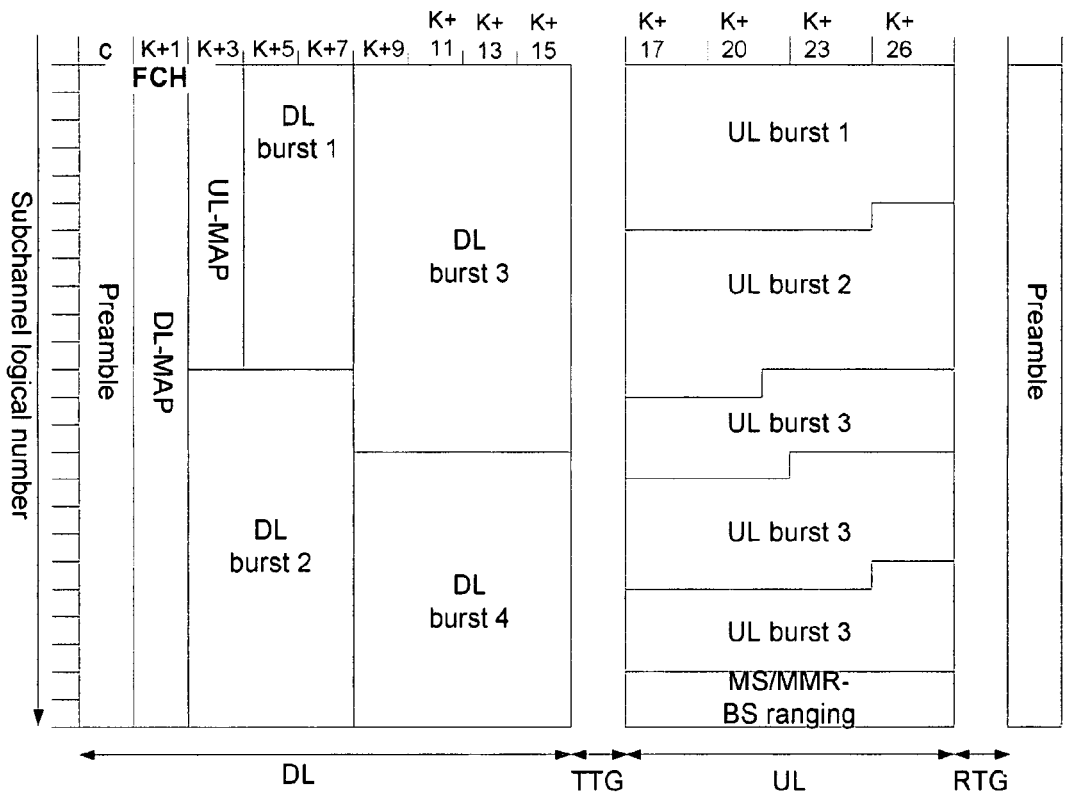
FIG. 3 is a diagram showing a conventional MAC frame format.
Figure 4:
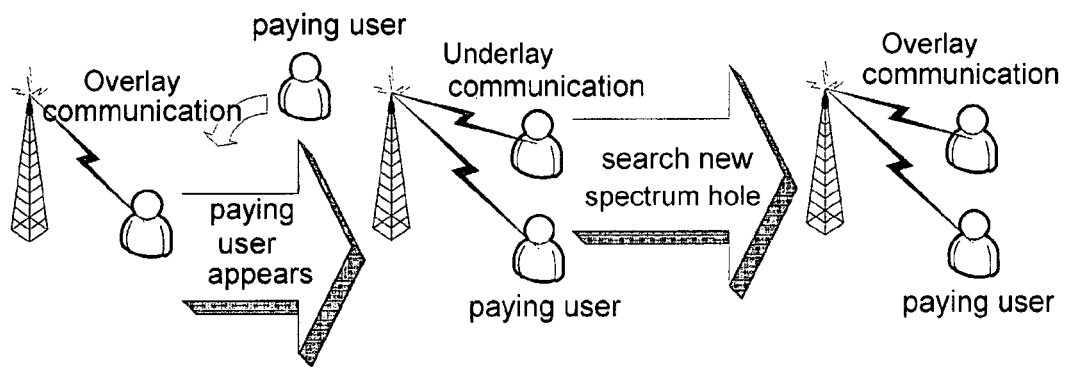
FIG. 4 is a diagram showing the concept of overlay-underlay switching technology used when a base station and a mobile station are located close to each other.

FIG. 4 is a diagram showing the concept of overlay-underlay switching technology in a physical layer.

An overlay transmission method and an underlay transmission method have different characteristics. The overlay transmission method can perform data communication only when usable resources such as spectrum holes exist, but is advantageous in that it has a long transmission distance. In contrast, the underlay transmission method outputs a signal at a noise level in a wide frequency band, and thus can used be anytime, but is disadvantageous in that it has a short transmission distance.

In the overlay transmission method, since a spectrum hole is found and data is transmitted using the spectrum hole, when a paying user desires to use that spectrum hole during the transmission of data, communication using the spectrum hole cannot be performed. In this case, a mobile station must find another usable spectrum hole and transmit data using the newly found spectrum hole. Accordingly, data communication is interrupted until communication is resumed using the new spectrum hole. That is, the overlay transmission method is problematic in that communication is frequently interrupted by paying users in a wireless communication environment in which a spectrum hole dynamically changes. Further, when the spectrum hole used by the paying user cannot be used, the mobile station must find another usable spectrum hole and resume communication using the found spectrum. However, there is a problem in that, when no new spectrum hole is found, communication is interrupted for a long period of time.

The present invention proposes technology for adaptively switching between overlay and underlay transmission methods as signal transmission/reception methods between a mobile station and a base station, as shown in FIG. 4. That is, when a paying user for a given spectrum hole, which is a communication pathway, appears while a base station 41 and a mobile station 42 are performing overlay communication, the base station 41 and the mobile station 42 switch from overlay communication to underlay communication after interrupting overlay communication. Further, when a new spectrum hole is found while underlay communication is being performed, the base station and the mobile station switch from the underlay communication back to overlay communication, and transmit/receive signals using the new spectrum hole.

In this case, when the base station and the mobile station are located close to each other, the base station and the mobile station can perform direct underlay communication, as shown in FIG. 4. However, in the case of underlay communication, since the possible communication distance is short, the base station and the mobile station cannot perform direct underlay communication when the base station and the mobile station are located far away from each other.

Figure 5:
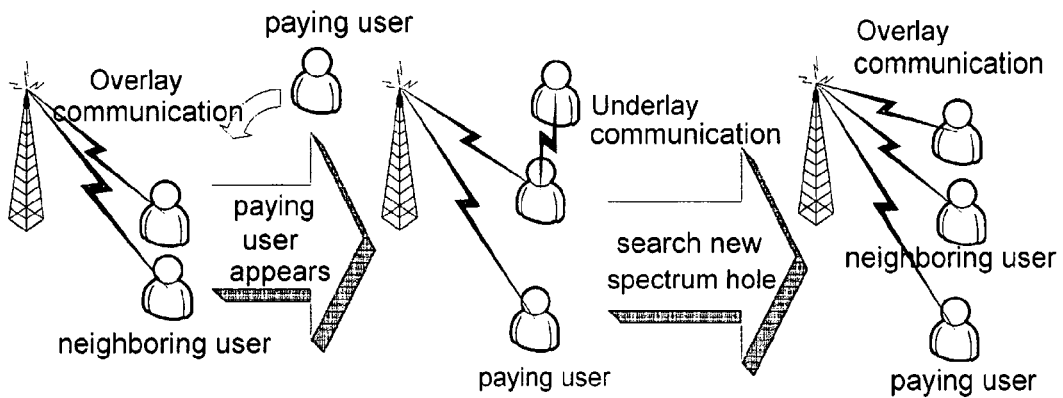
FIG. 5 is a diagram showing the concept of overlay-underlay switching technology used when a base station and a mobile station are placed far away from each other.

In order to solve this problem, the present invention enables signal transmission/reception using an underlay relay method through a neighboring mobile station, as shown in FIG. 5, in the case where the mobile station and the base station are located far away from each other when the signal transmission/reception method therebetween is switched to the underlay method. That is, when a paying user appears while a base station 51 and a mobile station 52 perform overlay communication, the base station 51 and the mobile station 52 perform underlay relay communication using a neighboring mobile station 54. When a new spectrum hole is found, the base station 51 and the mobile station 52 switch from the underlay relay communication back to overlay communication using the new spectrum hole. In this case, the neighboring mobile station 54 for relaying signals between the base station and the mobile station is called a relay station.

Further, when the mobile station cannot guarantee sufficient QoS using only underlay relay communication conducted through a single relay station, the mobile station requests cooperative transmission from a plurality of relay stations, thus performing communication corresponding to cooperative transmission together with the plurality of relay stations. In a conventional cognitive radio-based wireless communication system, a base station manages cooperative transmission. Due to this, there is a problem in that excessively high overhead occurs in the base station. In order to solve this problem, the present invention proposes adaptive cooperative transmission technology for allowing respective mobile stations to manage cooperative transmission. Such cooperative transmission technology can be considered to be a kind of underlay relay communication technology.

Figure 6:
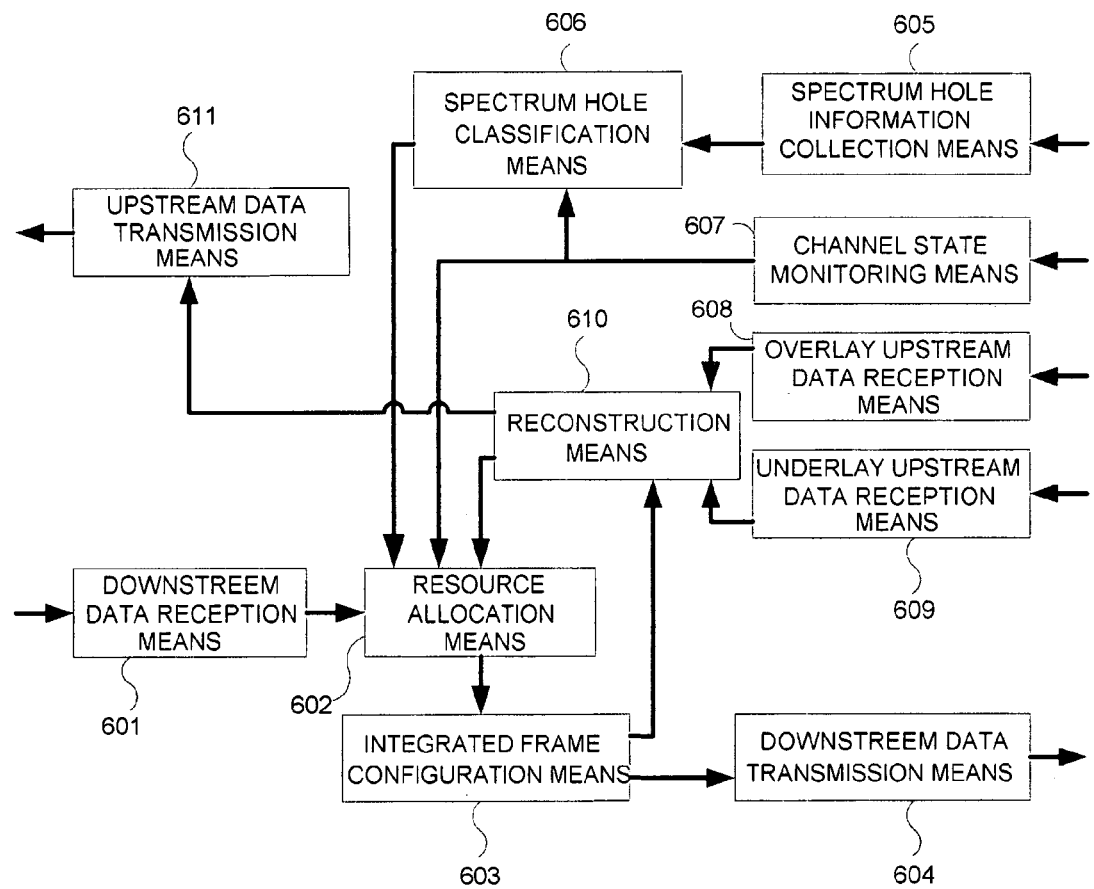
FIG. 6 is a functional block diagram showing a base station system constituting a cognitive radio-based wireless communication system according to the present invention.

FIG. 6 is a functional block diagram showing a base station system constituting the cognitive radio-based wireless communication system for implementing the above-described overlay-underlay switching technology, underlay relay communication technology, and adaptive cooperative transmission technology.

This base station system includes a downstream data reception means 601, a resource allocation means 602, an integrated frame configuration means 603, a downstream data transmission means 604, a spectrum hole information collection means 605, a spectrum hole classification means 606, a channel state monitoring means 607, an overlay upstream data reception means 608, an underlay upstream data reception means 609, a reconstruction means 610, and an upstream data transmission means 611.

The downstream data reception means 601 receives data to be transmitted to the mobile station from a higher layer, and transmits the received data to the resource allocation means 602.

The resource allocation means 602 detects spectrum hole classification information using the spectrum hole classification means 606, detects usable spectrum hole information using the channel state monitoring means 607, detects channel states and traffic characteristics of respective mobile stations using the reconstruction means 610, allocates spectrum resources to respective mobile stations, and transmits information about the allocation of the spectrum resources to the integrated frame configuration means 603.

The integrated frame configuration means 603 configures an integrated frame on the basis of the information about the resources, allocated by the resource allocation means 602 to respective mobile stations, provides information about the integrated frame to the reconstruction means 610, and transmits the integrated frame to respective mobile stations through the downstream data transmission means 604. The format of the integrated frame, newly proposed in the present invention, will be described later.

The spectrum hole information collection means 605 collects information about spectrum holes from neighboring systems and provides the collected spectrum hole information to the spectrum hole classification means 606.

The spectrum hole classification means 606 obtains information about respective spectrum holes both from the spectrum hole information collection means 605 and from the channel state monitoring means 607, classifies spectrum holes on the basis of the spectrum hole information, and provides the spectrum hole classification information to the resource allocation means 602.

The channel state monitoring means 607 monitors current channel states, determines whether a spectrum hole is being used, and provides the result of the determination both to the spectrum hole classification means 606 and the resource allocation means 602.

The overlay upstream data reception means 608 receives upstream data from each mobile station using an overlay method.

The underlay upstream data reception means 609 receives upstream data from each mobile station using an underlay method.

The reconstruction means 610 detects the resources allocated to respective mobile stations using the upstream data received from the mobile stations through the overlay upstream data reception means 608 and the underlay upstream data reception means 609, detects the channel states and traffic characteristics of respective mobile stations, and provides information about the channel states and traffic characteristics to the resource allocation means 602. Further, the reconstruction means 610 reconstructs upstream data transmitted through overlay or underlay communication to newly configure a single MAC frame, and thus transmits the MAC frame to the upstream data transmission means 611.

The upstream data transmission means 611 transmits the frame, newly configured by the reconstruction means 610, to a higher layer.

A procedure of the base station processing downstream data to be transmitted to the mobile station in the base station system of FIG. 6 is described below. First, the downstream data reception means 601 receives downstream data to be transmitted from the base station to the mobile station from a higher layer. The base station recognizes information about usable spectrum holes through the spectrum hole information collection means 605 and the spectrum hole classification means 606, and detects traffic characteristics of respective mobile stations through the channel state monitoring means 607. The resource allocation means 602 allocates resources to respective mobile stations on the basis of the spectrum hole information and the traffic characteristic information of mobile stations. After the resource allocation means 602 allocates resources to respective mobile stations, the integrated frame configuration means 603 configures an integrated frame, and transmits data to respective mobile stations through the downstream data transmission means 604 using an overlay or underlay method.

Next, a procedure of the base station processing upstream data, received from each mobile station, is described below. The overlay upstream data reception means 608 receives upstream data from mobile stations through overlay communication. The underlay upstream data reception means 609 receives upstream data from the mobile stations through underlay communication. The reconstruction means 610 selects underlay or overlay communication using information about the resources allocated by the integrated frame configuration means 603 to respective mobile stations, receives upstream data from respective mobile stations through both the overlay upstream data reception means 608 and the underlay upstream data reception means 609, and reconstructs the upstream data to reconfigure a single MAC frame. Further, the reconstruction means 610 detects channel states and traffic characteristics of respective mobile stations from the information received from the mobile stations, and provides information about the channel states and traffic characteristics to the resource allocation means 602. The frame reconfigured by the reconstruction means 610 is transmitted to the upstream data transmission means 611, and is then transmitted to a higher layer.

Figure 7:
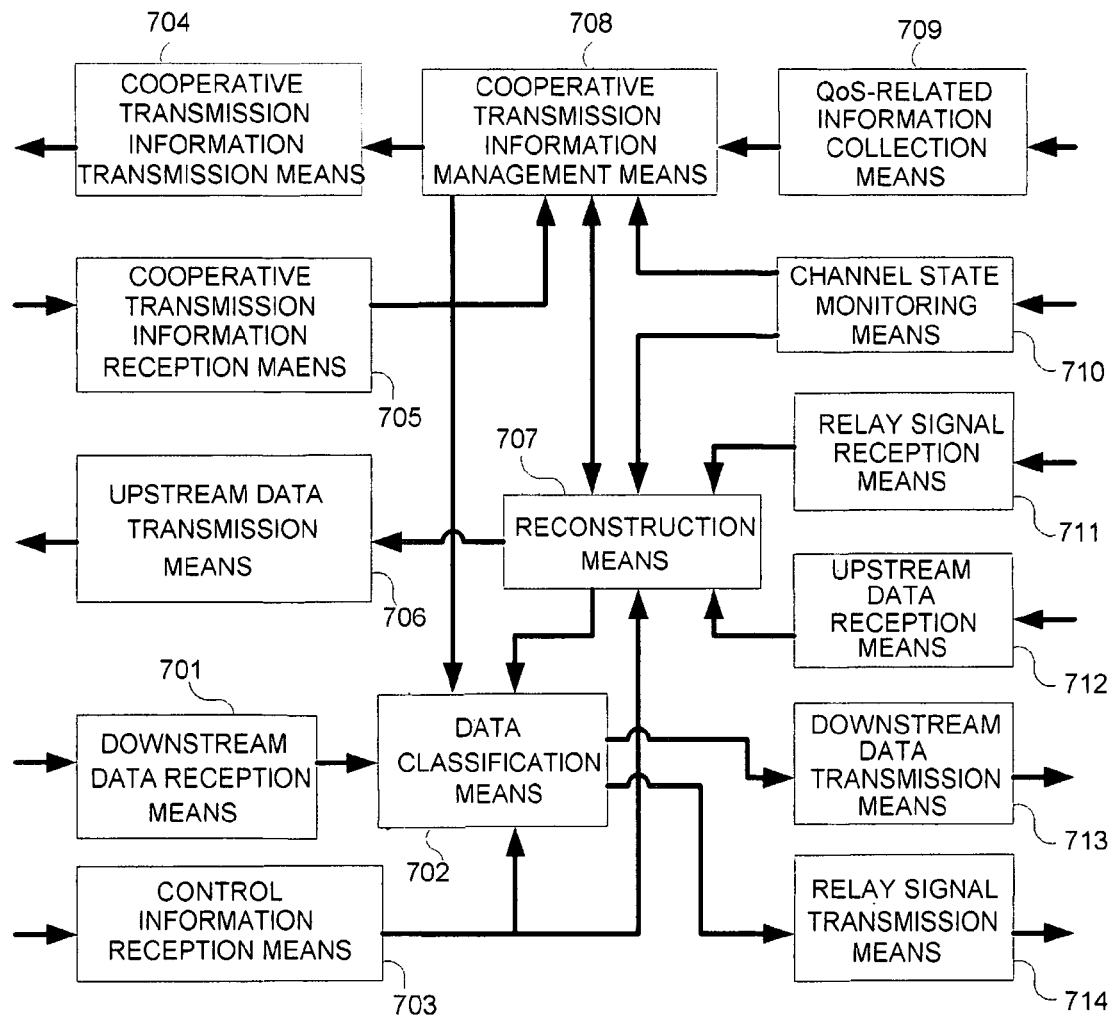
FIG. 7 is a functional block diagram showing a mobile station system constituting the cognitive radio-based wireless communication system according to the present invention.

FIG. 7 is a functional block diagram showing a mobile station system constituting the cognitive radio-based wireless communication system for implementing the above-described overlay-underlay switching technology, underlay relay communication technology, and adaptive cooperative transmission technology.

The mobile station system includes a downstream data reception means 701, a data classification means 702, a control information reception means 703, a cooperative transmission information transmission means 704, a cooperative transmission information reception means 705, an upstream data transmission means 706, a reconstruction means 707, a cooperative transmission information management means 708, a QoS-related information collection means 709, a channel state monitoring means 710, a relay signal reception means 711, an upstream data reception means 712, a downstream data transmission means 713, and a relay signal transmission means 714.

The downstream data reception means 701 receives downstream data transmitted from the base station using an overlay or underlay method. The downstream data transmitted from the base station to mobile stations includes data transmitted to the given mobile station itself, and a signal to be relayed to another mobile station through the given mobile station.

The control information reception means 703 receives control information from the base station.

The data classification means 702 classifies the downstream data received through the downstream data reception means 701 into the data transmitted to the given mobile station, and the signal to be relayed to the other mobile station. The classification of the two types of data is performed using the control information received from the base station through the control information reception means 703 and the cooperative transmission information received through the cooperative transmission information management means 708.

The downstream data transmission means 713 transmits the downstream data, classified by the data classification means 702 as the data transmitted to the given mobile station, to a higher layer.

The relay signal transmission means 714 transmits the downstream data, classified by the data classification means 702 as the data to be relayed to the other mobile station, to the corresponding mobile station using an underlay relay method.

The QoS-related information collection means 709 receives QoS-related information, such as the Packet Error Ratio (PER) or delay of the given mobile station, and transmits the QoS-related information to the cooperative transmission information management means 708.

The channel state monitoring means 710 monitors the current radio communication state and transmits the monitored information both to the cooperative transmission information management means 708 and to the reconstruction means 707.

The relay signal reception means 711 receives an underlay relay signal from a neighboring mobile station and transmits the received underlay relay signal to the reconstruction means 707. Further, the relay signal reception means 711 may receive a cooperative transmission signal from the neighboring mobile station, and may transmit the cooperative transmission signal to the reconstruction means 707.

The upstream data reception means 712 receives upstream data to be transmitted to the base station from a higher layer, and transmits the upstream data to the reconstruction means 707.

The cooperative transmission information management means 708 manages information for cooperative transmission-based communication. The cooperative transmission information management means 708 determines whether a target QoS can be satisfied on the basis of the QoS-related information, received from the QoS-related information collection means 709, and the channel information, received from the channel state monitoring means 710, and requests cooperative transmission from relay stations through the cooperative transmission information transmission means 704 if it is determined that the target QoS cannot be satisfied. Furthermore, when cooperative transmission is accepted by the relay stations through the cooperative transmission information reception means 705, cooperative transmission is performed using the mobile stations which have accepted cooperative transmission. In contrast, if it is determined that target QoS can be satisfied without using cooperative transmission, the cooperative transmission information management means 708 requests relay stations to stop cooperative transmission through the cooperative transmission information transmission means 704. Further, when a cooperative transmission request is received from another mobile station through the cooperative transmission information reception means 705, the cooperative transmission information management means 708 determines whether to perform cooperative transmission using the channel information thereof, and transmits an indication of acceptance or denial of the cooperative transmission through the cooperative transmission information transmission means 704.

The cooperative transmission information transmission means 704 transmits information about cooperative transmission to neighboring mobile stations under the control of the cooperative transmission information management means 708.

The cooperative transmission information reception means 705 receives information about cooperative transmission from neighboring mobile stations, and transmits the received information to the cooperative transmission information management means 708.

The reconstruction means 707 reconstructs upstream data, relay signals, and channel information. That is, the reconstruction means 707 receives the channel information transmitted through the channel state monitoring means 710, the relay signal transmitted through the relay signal reception means 711, and the upstream data transmitted through the upstream data reception means 712, and classifies the input signals into data to be transmitted to the base station or another mobile station using an overlay or underlay method, and data received from relay stations for cooperative transmission, on the basis of the control information received from the control information reception means 703 and the cooperative transmission-related information received from the cooperative transmission information management means 708. The reconstruction means 707 transmits the former kind of data to the base station or relay stations through the upward data transmission means 706 using the overlay or underlay method, and transmits the latter kind of data to a higher layer through the data classification means 702 to enable smooth cooperative transmission.

The upward data transmission means 706 allows the reconstruction means 707 to perform overlay/underlay communication with the base station or the neighboring mobile station.

A procedure of the mobile station of FIG. 7 processing the downstream data received from the base station is described. First, the downstream data reception means 701 receives the downstream data from the base station using an overlay or underlay method. The downstream data received from the base station includes downstream data transmitted to a given mobile station, and a relay signal to be relayed to another mobile station. The control information reception means 703 receives the control information from the base station. The data classification means 702 classifies the downstream data into downstream data transmitted to the given mobile station and the relay signal to be relayed to another mobile station on the basis of the control information. Meanwhile, the data classification means 702 further uses the cooperative transmission information received from the cooperative transmission information management means 708 when classifying the downstream data into the downstream data transmitted to the given mobile station and the relay signal to be relayed to another mobile station. The downstream data, classified in this way as the downstream data transmitted to the given mobile station, is transmitted to a higher layer through the downstream data transmission means 713. The relay signal to be relayed to another mobile station is relayed to a neighboring mobile station through the relay signal transmission means 714 using an underlay relay communication method.

Next, a procedure of the mobile station transmitting upstream data to the base station is described. The upstream data reception means 712 receives upstream data to be transmitted to the base station from a higher layer. According to a signal transmission method, the upstream data to be transmitted to the base station can be directly transmitted to the base station using an overlay or underlay method, or can be transmitted to the base station through a neighboring mobile station (relay station) using an underlay relay method. The reconstruction means 707 receives channel information from the channel state monitoring means 710, reconstructs the upstream data, and directly transmits the reconstructed upstream data to the base station using the overlay or underlay method, or transmits the reconstructed upstream data through a relay station using the underlay relay method.

Next, a procedure of the mobile station performing cooperative transmission together with a neighboring mobile station is described. The QoS-related information collection means 709 recognizes QoS-related information, such as the PER and delay time of the mobile station itself, and the channel state monitoring means 710 monitors the radio communication states of respective channels. The relay signal reception means 711 receives signals from a neighboring mobile station. The relay signal reception means 711 receives data transmitted using an underlay relay method or cooperative transmission data from a relay station. The cooperative transmission information management means 708 determines whether a desired channel to be used can satisfy a target QoS using the QoS-related information and information about the radio communication states of channels, and requests cooperative transmission from neighboring mobile stations through the cooperative transmission information transmission means 704 if it is determined that the desired channel cannot satisfy the target QoS. Thereafter, when cooperative transmission is accepted by the neighboring mobile stations through the cooperative transmission information reception means 705, cooperative transmission is performed using the neighboring mobile stations. Meanwhile, the cooperative transmission information management means 708 continuously monitors the QoS-related information and the radio communication states of channels even during the performance of cooperative transmission, and then requests the corresponding mobile stations, which participate in the cooperative transmission, to stop cooperative transmission through the cooperative transmission information transmission means if it is determined that the channel can satisfy the target QoS without using cooperative transmission. The cooperative transmission data from the mobile stations, which participate in cooperative transmission, is received through the relay signal reception means 711. Such cooperative transmission data is transmitted to a higher layer through the reconstruction means 707 and the data classification means 702.

Meanwhile, when a cooperative transmission request is received from a neighboring mobile station through the cooperative transmission information reception means 705, the cooperative transmission information management means 708 determines whether to accept the cooperative transmission request on the basis of the QoS-related information and the radio communication states of respective channels, and transmits the result of the determination to the mobile station that transmitted the cooperative transmission request, through the cooperative transmission information transmission means 705.

Figure 8:
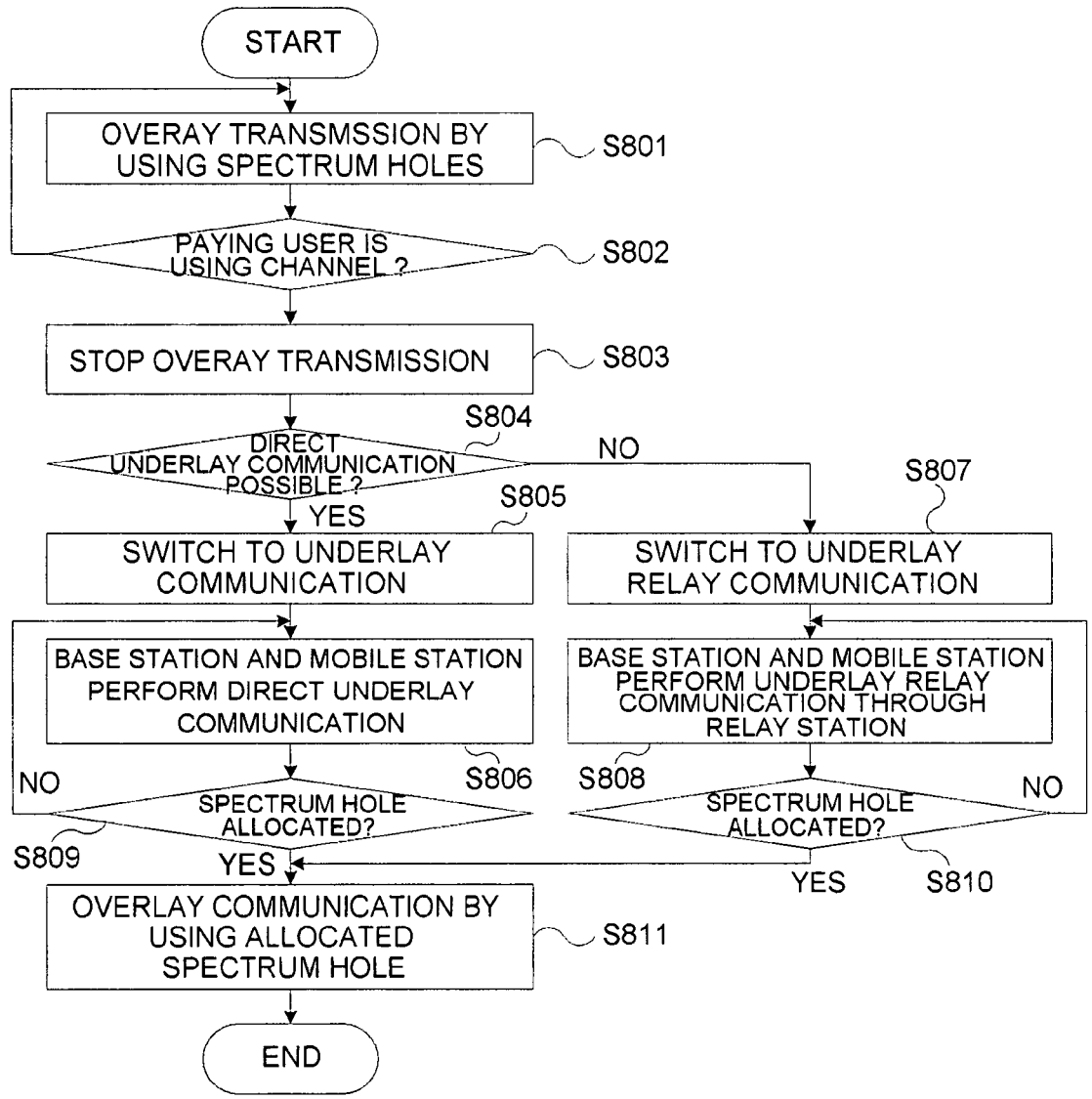
FIG. 8 is a flowchart showing the operation of an overlay-underlay switching procedure in a cognitive radio-based wireless communication system.

FIG. 8 is a flowchart showing the operation of an overlay-underlay switching procedure in the cognitive radio-based wireless communication system of FIGS. 6 and 7.

As described above, overlay communication and underlay communication have advantages and disadvantages that complement each other. That is, the overlay transmission method can be used only when usable resources, such as spectrum holes, exist, but is advantageous in that, even if the base station and the mobile station are located far away from each other, communication is possible. In contrast, since the underlay transmission method outputs a signal at a noise level in a wide frequency band, communication is possible even if usable resources, such as spectrum holes, do not exist, but is disadvantageous in that the possible transmission distance is short.

The present invention proposes technology for allowing a base station and a mobile station to communicate with each other while performing switching between overlay communication and underlay communication in the cognitive radio-based wireless communication system.

That is, when a paying user for a spectrum hole appears during the performance of overlay communication, the base station and the mobile station switch from overlay communication to underlay communication. When a suitable spectrum hole is found during the performance of the underlay communication, the base station and the mobile station switch from underlay communication to overlay communication. When switching from overlay communication to underlay communication is performed, direct underlay communication is performed if the base station and the mobile station are located close to each other, whereas underlay relay communication is performed through a relay station if the base station and the mobile station are located far away from each other.

FIG. 8 is a flowchart showing the operation of an overlay-underlay switching procedure according to the present invention.

A cognitive radio-based base station and a cognitive radio-based mobile station are allocated spectrum holes, and perform overlay transmission using the spectrum holes at step S801.

When the use of the channel corresponding to the spectrum hole by a paying user is detected during overlay transmission at step S802, the base station and the mobile station stop the overlay transmission being conducted using the spectrum hole at step S803. That is, the base station and the mobile station monitor the state of the channel corresponding to the spectrum hole using the channel state monitoring means 607 and 710, respectively, even during the performance of overlay transmission. In this case, the extent of use of the channel (signal intensity) is measured. When channel interference increases to a specific value or more, it is determined that the paying user uses the corresponding channel, and overlay communication being conducted using the spectrum hole is stopped.

When the paying user uses the channel in this way, the base station and the mobile station switch from overlay communication to underlay communication, and thus transmit or receive data. When the base station and the mobile station are located close to each other, and direct underlay communication is thus possible at step S804, the mobile station switches the signal transmission method to underlay communication at step S805, and thus the base station and the mobile station perform direct underlay communication at step S806. Meanwhile, when the base station and the mobile station are located far away from each other, and direct underlay communication is impossible at step S804, the mobile station switches a signal transmission method to underlay relay communication at step S807, and the base station and the mobile station perform underlay relay communication through a relay station (neighboring mobile station) at step S808.

When the base station monitors a channel state and is allocated a usable spectrum hole while the base station and the mobile station perform direct underlay communication at step S809, the base station and the mobile station switch the signal transmission method, and perform overlay communication using the newly allocated spectrum hole at step S811.

Meanwhile, when the base station monitors a channel state and is allocated a usable spectrum hole while the base station and the mobile station perform underlay relay communication through the relay station at step S810, the base station and the mobile station switch the signal transmission method, and perform overlay communication using the newly allocated spectrum hole at step S811.

Hereinafter, underlay relay communication is described in detail below.

Typically, when the cognitive radio-based wireless communication system uses relay communication, the total capacity of the system can be increased, and the coverage of the system can also be increased. However, if the number of relay stations is large when a mobile station functions as a relay station for relay communication and the mobile station, which is the relay station, performs relay communication through overlay communication using a spectrum hole, there may occur a problem in that spectrum holes become insufficient, and the total capacity of the system is reduced instead.

Figure 9:
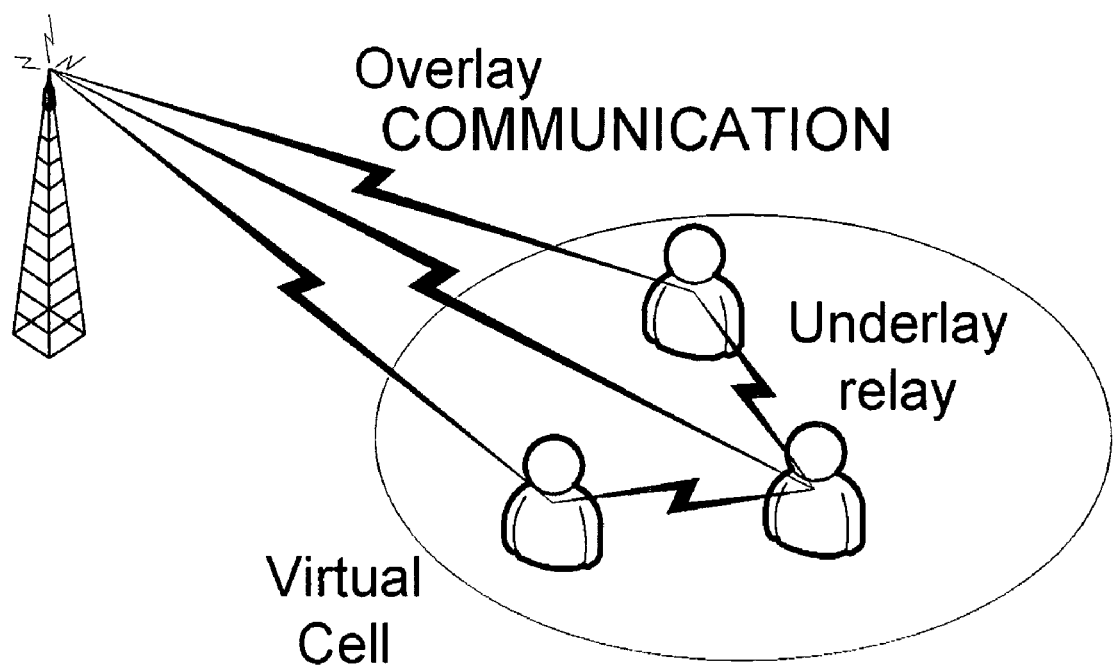
FIG. 9 is a conceptual view showing underlay relay communication.

The present invention proposes an underlay relay communication method in order to prevent such scarcity of spectrum holes. FIG. 9 is a conceptual view of underlay relay communication. This underlay relay communication is a communication method of setting a virtual cell 91 at a certain radius and allowing terminals, located within the virtual cell, to relay signals while functioning as relay stations for each other through underlay communication. That is, since the terminals placed at similar locations are grouped into a single virtual cell, the distance between the terminals is decreased, and thus underlay communication between the terminals is possible.

The underlay relay method of the present invention functions to compensate for the disadvantage of the overlay-underlay switching technology. That is, in the case where the base station is located far away from the mobile station when switching from an overlay method to an underlay method is performed at the time of performing overlay-underlay switching, the base station and the mobile station cannot directly communicate with each other using the underlay method. In this case, when the underlay relay method is used, the mobile station can perform data communication with the base station through a relay station. As in the case of the present invention, relay communication is performed using the underlay method, so that the scarcity of spectrum holes in the entire system can be prevented, and the total capacity of the system can be increased through the relay communication.

Figure 10:
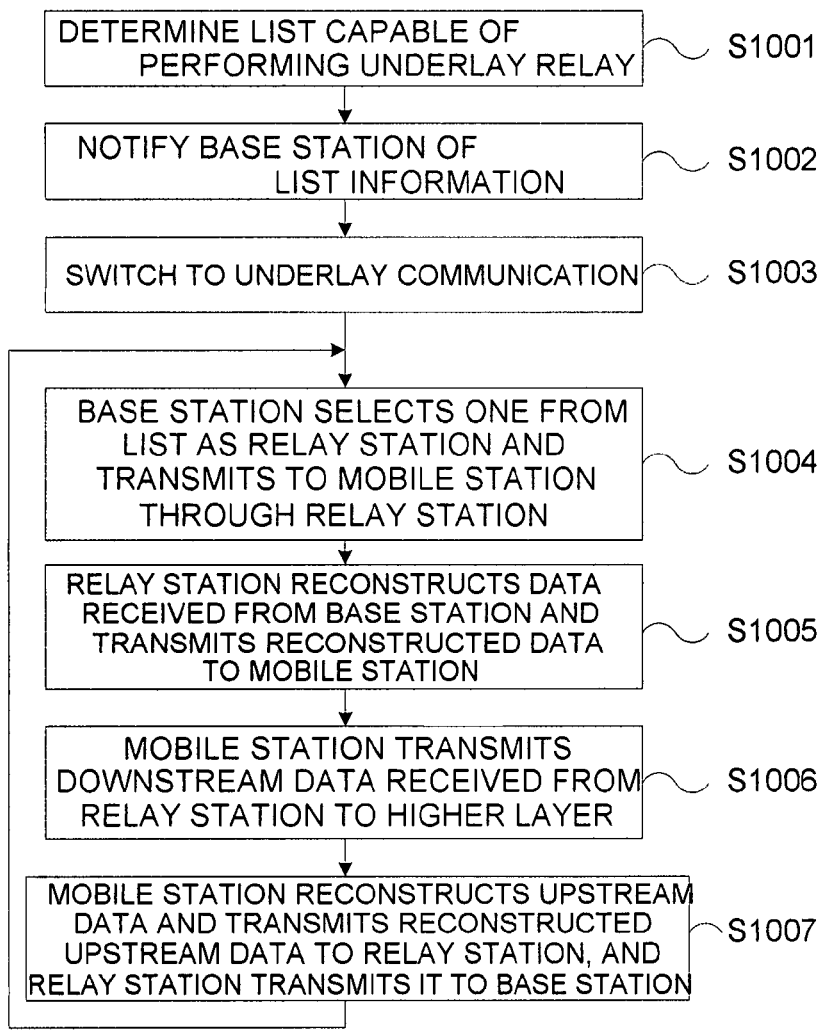
FIG. 10 is a flowchart showing the operation of an underlay relay procedure according to the present invention.

FIG. 10 is a flowchart showing the operation of an underlay relay procedure. First, the mobile station transmits a pilot signal to neighboring mobile stations through the upstream data transmission means 706, receives responses (acknowledgement: ACK) through the relay signal reception means 711, and determines a list of available mobile stations capable of performing underlay communication, among the neighboring mobile stations, at step S1001. The reconstruction means 707 of the mobile station manages information about the list, and notifies the base station of the list of available neighboring mobile stations capable of performing underlay communication at step S1002. When switching from overlay communication to underlay communication is performed due to the appearance of a paying user at step S1003, the base station selects one from the list of available mobile stations capable of performing underlay communication with the corresponding mobile station, transmits data to the selected mobile station (relay station), and also transmits control information related to the transmission of data, together with the data at step S1004. That is, the relay station receives downstream data and the related control information from the downstream data reception means 701 and the control information reception means 703, respectively, recognizes that the received downstream data is data to be transmitted to another mobile station using an underlay relay method, and relays the downstream data to a corresponding mobile station through the data classification means 702 and the relay signal transmission means 714 at step S1005. The base station notifies the mobile station that is the target for receiving the data, of the information about the relay station. The mobile station, which is the data reception target, receives the signal, transmitted using the underlay relay method, through the relay signal reception means 711 on the basis of the information in the notification. The reconstruction means 707 reconstructs the received signal, and transmits the reconstructed signal to a higher layer through the downstream data transmission means 713 at step S1006.

Meanwhile, when the mobile station, desiring to transmit data, transmits data to the base station using an underlay relay method, the mobile station receives upstream data to be transmitted to the base station from the higher layer through the upstream data reception means 712. The reconstruction means 707 reconstructs the upstream data, and transmits the reconstructed upstream data to the relay station through the relay signal transmission means 714. The relay station reconstructs the upstream data, and transmits the reconstructed upstream data to the base station at step S1007.

Next, the cognitive cooperative transmission technology of the present invention is described below.

When the underlay relay communication between the base station and the mobile station is performed through the relay station, the capacity of the system can be increased and the QoS of each terminal can be guaranteed through cooperative transmission between the base station and the relay station. In this cooperative transmission-based communication method, a single mobile station receives data from a plurality of relay stations through cooperative transmission. For cooperative transmission-based communication, relay stations, from which a single mobile station must receive data, must be determined, and the target QoS of the terminal, current channel state, the state of surrounding channels of the terminal, etc. must be detected so as to manage cooperative transmission-based communication.

Therefore, there is a problem in that, when the base station manages cooperative transmission-based communication, signaling overhead and complexity required to manage cooperative transmission are excessively increased. Further, since the target QoS of the mobile station, the channel state of the corresponding terminal, and the state of surrounding channels of the terminal vary dynamically, excessively high overhead is caused in adaptively varying cooperative transmission in accordance with the dynamic variation.

The present invention proposes a method of allowing each mobile station to cognitively determine cooperative transmission-based communication on the basis of the target QoS thereof and the state of surrounding channels. In such a cognitive cooperation transmission communication method, since terminals cognitively perform cooperative transmission, there is an advantage in that the problem of control overhead in the base station does not occur. Therefore, efficient cooperative transmission-based communication is possible.

Figure 11:
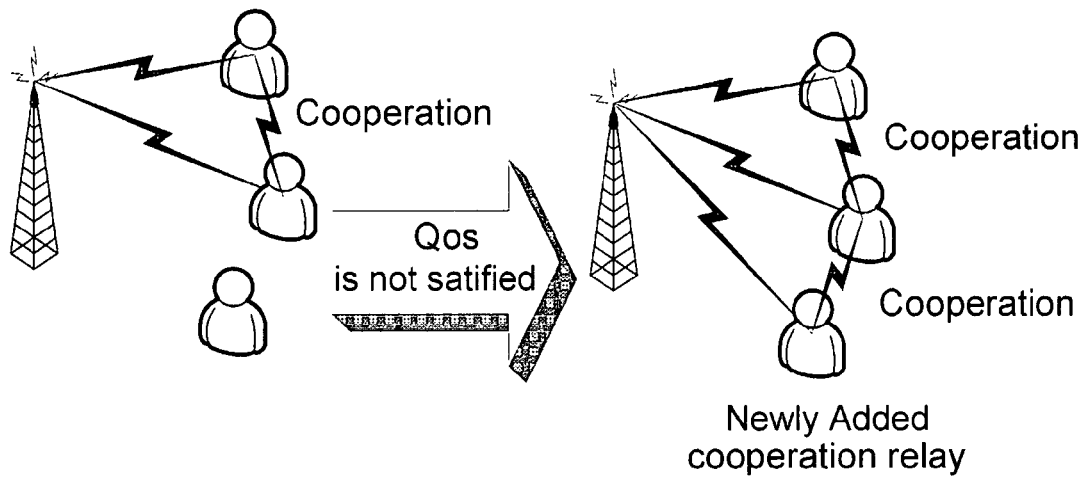
FIG. 11 is a conceptual view showing a cognitive cooperative transmission-based communication method according to the present invention.

FIG. 11 is a conceptual view showing a cognitive cooperative transmission-based communication method according to the present invention.

The mobile station monitors the communication state thereof, and requests cooperative transmission-based communication from neighboring mobile stations when a target QoS is not currently satisfied. FIG. 11 is a diagram showing the state in which a mobile station 111 that requested cooperative transmission, performs cooperative transmission-based communication together with a mobile station 112 that accepted cooperative transmission. When the target QoS is not satisfied, even though the mobile station 111 that requested cooperative transmission and the mobile station 112 that accepted cooperative transmission are performing cooperative transmission, the mobile station 111 that requested cooperative transmission transmits a cooperative transmission request message to neighboring mobile stations, and adds a mobile station 113 that accept the request to a cooperative transmission list. In this way, the mobile station 111 that requested cooperative transmission can perform cooperative transmission-based communication together with the two mobile stations 112 and 113 that have accepted cooperative transmission, so that the state of communication is improved, and the target QoS of the mobile station is consequently satisfied. The mobile station that requested cooperative transmission and is performing cooperative transmission together with other mobile stations, continuously monitors the QoS thereof, and sequentially removes the mobile stations participating in cooperative transmission if it is determined that the target QoS can be satisfied without using cooperative transmission.

A procedure for performing cognitive cooperative transmission-based communication is described with reference to FIG. 7. The mobile station collects QoS-related information, such as the PER and delay for data transmission, through the QoS-related information collection means 709, and checks information about target QoS. Further, the mobile station monitors the channel state through the channel state monitoring means 710, and collects information about the channel state. If it is determined that the current communication state does not satisfy the target QoS on the basis of the collected information, the cooperative transmission information management means 708 requests cooperative transmission from neighboring mobile stations through the cooperative transmission information transmission means 704. In this case, the neighboring mobile stations, from which cooperative transmission is requested, are limited to mobile stations included in a list of available mobile stations capable of performing underlay relay communication.

The neighboring mobile stations are requested to perform cooperative transmission through the cooperative transmission information transmission means thereof, and accept the request for cooperative transmission through the cooperative transmission information reception means thereof if it is determined, in consideration of the channel state and QoS-related information thereof, that there is no difficulty in operation even though cooperation transmission is performed.

The mobile station that requested cooperative transmission receives a message of acceptance of the cooperative transmission request through the cooperative transmission information transmission means 705. The cooperative transmission information management means 708 manages a list of available mobile stations capable of performing cooperative transmission. The cooperative transmission information management means 708 determines the terminal with which cooperative transmission is to be performed on the basis of the list of available mobile stations capable of performing cooperative transmission. A mobile station that accepted cooperative transmission transmits cooperative transmission data, received from the base station, to the mobile station that requested cooperative transmission. The mobile station that requested cooperative transmission receives the cooperative transmission data from the mobile station that accepted cooperative transmission through the relay signal reception means 711.

The reconstruction means 707 detects the cooperative transmission data on the basis of the information of the cooperative transmission information management means 708, combines the downstream data received from the base station with the cooperative transmission data, and transmits the combined data to a higher layer.

The cognitive radio-based wireless communication system has difficulty stably transmitting data because a frequency band that remains useful over time, along with sufficient transmission time, cannot be guaranteed. In order to overcome this difficulty, the present invention is implemented to include the integrated frame configuration means 603 in the base station. The integrated frame configuration means 603 generates a single integrated MAC frame, and supports communication with various types of physical layers (PHY), thus improving the stability of services.

The integrated frame configuration means detects spectrum holes using both channel information for each frequency band (Channel Quality Index: CQI) received from a physical layer through the overlay upstream data reception means and the underlay upstream data reception means, and related information received from an adjacent mobile station and the base station. Further, the integrated frame configuration means divides MAC Service Data Unit (SDU)-format downstream data received from a higher layer, thus generating a PHY Protocol Data Unit (PDU) for each physical layer. In this case, header information of the integrated frame, which indicates the channel from which the terminal is to receive information and the type of information that the terminal must receive from the channel, is transmitted as a control signal through a fixedly allocated channel before data transmission is performed. The integrated MAC frame, generated by the integrated frame configuration means, is logically represented in FIG. 12.

Figure 12:
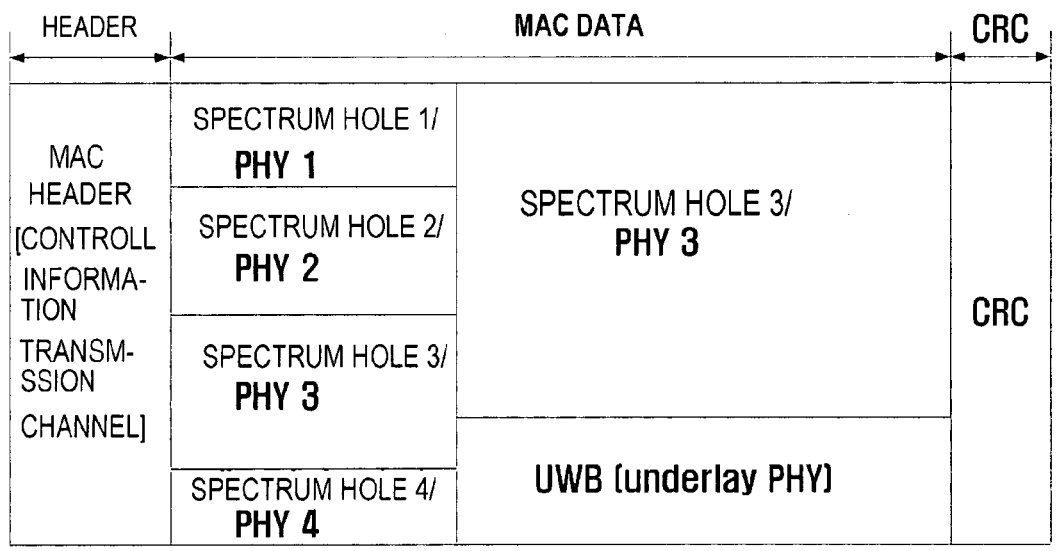
FIG. 12 is a diagram logically showing an integrated MAC frame.

The integrated MAC frame of FIG. 12 is described. The base station transmits the header of an integrated MAC frame to a mobile station through a control channel before data communication is performed. The mobile station determines which physical layer is used to currently transmit or receive MAC data on the basis of the header information of the integrated MAC frame, combines the data received through the corresponding physical layer, and thus completes a single MAC frame. If a paying user having priority appears in the specific physical layer and the base station stops data transmission, the mobile station receives data through a physical layer available for communication, thus completing a MAC frame. That is, when a conflict occurs in a specific spectrum hole, all of the data transmitted using the spectrum hole is lost. At this time, only data in the specific frequency band in which the error occurred, rather than the entire MAC frame, is retransmitted using another spectrum hole, and the MAC frame is completed, thus improving spectrum use efficiency. When the number of usable spectrum holes between the base station and the mobile station is insufficient, the base station and the mobile station may transmit or receive part of the MAC frame through overlay transmission, and may transmit or receive the remaining part of the MAC frame through underlay transmission. Further, in order to satisfy QoS according to the characteristics of traffic, the header of an integrated MAC frame is changed, and thus the size of the frame can be variably adjusted.

Figure 13:
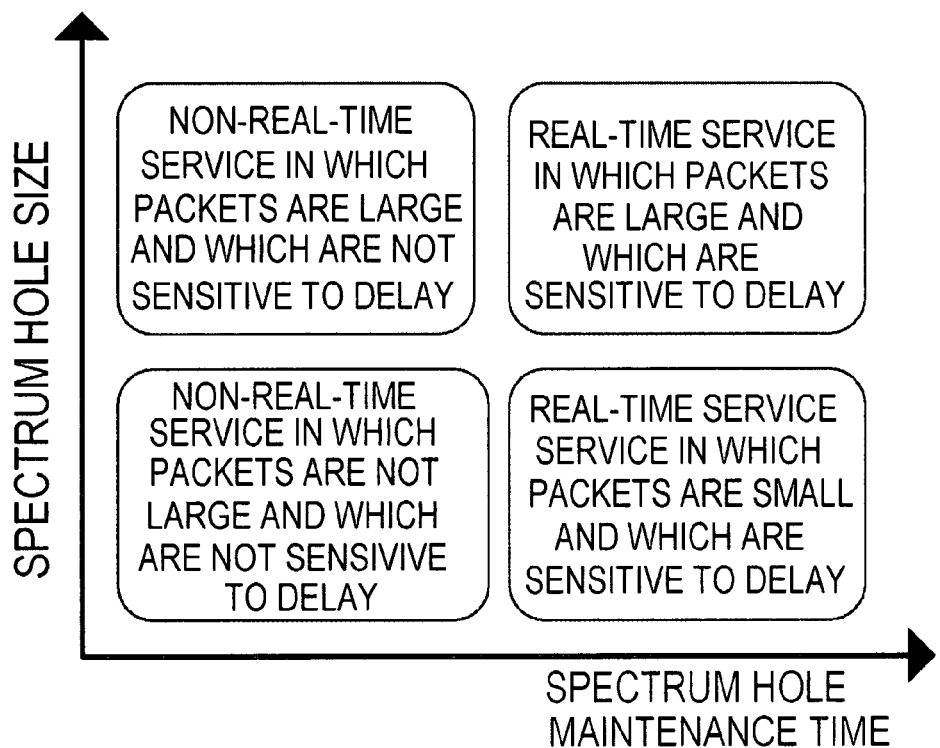
FIG. 13 is a diagram showing a state in which spectrum holes are classified so as to efficiently use a spectrum.

FIG. 13 is a diagram showing the state in which spectrum holes are classified to realize efficient use of a spectrum. According to the type thereof, a spectrum may include a stable channel which can be used by a user for a long period of time, and an unstable channel which is frequently used by paying users and in which communication is instantaneously interrupted by the paying users.

A conventional cognitive radio-based wireless communication system sequentially allocates spectrum holes according to the user's necessity regardless of the characteristics of spectrum holes or the characteristics of the services requested by the user. Due to this, there are problems in that a spectrum hole having a short maintenance time is allocated to the user who requested real-time service, which is sensitive to delay, or in that a spectrum hole having a long maintenance time and a wide bandwidth is allocated to a user who only requested a low QoS service, and thus either communication is frequently interrupted or spectrum is wasted.

The base station and the mobile station may have different spectrum holes according to the locations thereof. Therefore, in the case of a system operating on the basis of the base station, whether to use a spectrum must be determined through the exchange of information about spectrum holes of the base station and the mobile station. In contrast, in the case of a system in which a mobile station can independently transmit data, the mobile station detects surrounding spectrum information, and can freely use spectrum holes within a range in which the spectrum does not influence adjacent users.

In order to mutually provide information about spectrum holes, the base station and the mobile station must periodically or non-periodically notify each other of information, such as a frequency band, bandwidth, spectral power density, directionality, and location. Further, different systems can share their spectrum usage information and usage schedules with each other, and can predict later variation in the extent and environment of use of a spectrum.

The present invention proposes a method of classifying spectrum holes according to maintenance time and size and allocating the spectrum holes according to the characteristics of services requested by users in this way, rather than randomly allocating spectrum holes. In the present invention, spectrum holes are classified into the following four classes according to the maintenance time and size thereof, and are allocated for respective classes to provide suitable services, as shown in FIG. 13.

Class 1: Spectrum Holes Having Long Maintenance Time and Wide Bandwidth

This is allocated for real-time services, in which large packets are frequently generated, and which are sensitive to delay, as in the case of a video streaming service.

Class 2: Spectrum Holes Having Long Maintenance Time and Narrow Bandwidth

This is allocated for real-time services, which are sensitive to delay, and in which small packets are frequently generated, as in the case of Voice over Internet Protocol (VoIP) service.

Class 3: Spectrum Holes Having Short Maintenance Time and Wide Bandwidth

This is allocated for non-real-time services, in which large packets are intermittently generated, and which are not sensitive to delay, as in the case of File Transfer Protocol (FTP) service.

Class 4: Spectrum Holes Having Short Maintenance Time and Narrow Bandwidth

This is allocated for non-real-time services, in which small packets are intermittently generated, and which are not sensitive to delay, as in the case of Hyper Text Transfer Protocol (HTTP) service.

When the mobile station requests a communication service, the base station checks the class of the service requested by the user of the mobile station during an initialization procedure, and adaptively allocates a spectrum hole according to the class of the service requested by the user.

With reference to FIG. 6, the procedure for classifying and allocating spectrum holes is described.

The spectrum hole classification means 606 of the base station collects information about spectrum holes from neighboring systems through the spectrum hole information collection means 605. The channel state monitoring means 607 monitors a channel state, and obtains information about the actual spectrum hole (size and maintenance time). At this time, the size of the spectrum hole is detected through actual spectrum management, and the maintenance time is detected by estimating the maintenance time on the basis of the statistical values of respective spectrum holes.

The spectrum hole classification means 606 classifies the spectrum holes into respective classes on the basis of the size and maintenance time of the spectrum holes.

The resource allocation means 602 adaptively allocates resources to respective mobile stations depending on the characteristics of respective spectrum holes and the characteristics of the services requested by users. The characteristics of the services requested by the users can be obtained when transmission to each mobile station is initialized.

The present invention adaptively allocates spectrum holes according to the service characteristics of users, thus optimizing system performance while guaranteeing the QoS that is experienced by the users.

Although the technical spirit of the present invention has been disclosed for illustrative purposes, only preferred embodiments are illustrated and described, but are not intended to limit the present invention. Further, those skilled in the art will appreciate that various modifications, additions and substitutions are possible, without departing from the scope and spirit of the invention.

The invention claimed is:

1. An air interface method for wireless communication in a cognitive radio-based wireless communication system, the wireless communication system comprising a base station system and a plurality of mobile station systems, comprising:
a first step of the base station system and a mobile station system communicating with each other by using an overlay method that uses a spectrum hole; and
a second step of the base station system and the mobile station system switching from the overlay method to an underlay method to communicate with each other when a paying user having high priority performs communication by using the spectrum hole.

2. The air interface method according to claim 1, further comprising a third step of the base station system and the mobile station system switching from the underlay method to the overlay method to communicate with each other when a new spectrum hole is allocated to the mobile station system after the second step has been terminated.

3. An air interface method for wireless communication in a cognitive radio-based wireless communication system, the wireless communication system comprising a base station system and a plurality of mobile station systems, comprising:
a fourth step of the base station system and a certain mobile station system communicating with each other using an underlay method; and
a fifth step of the base station system and the mobile station system switching from the underlay method to an overlay method to communicate with each other when a new spectrum hole is allocated to the mobile station system.

4. The air interface method according to claim 1, wherein the second step is performed such that, when a distance between the base station system and the mobile station system is too long to perform direct underlay communication, the base station system and the mobile station system perform underlay relay communication by using a neighboring mobile station system as a relay station.

5. The air interface method according to claim 4, wherein the relay station for the underlay relay communication is located within a certain radius around the mobile station system.

6. The air interface method according to claim 1, wherein the mobile station system is operated such that, when a current Quality of Service (QoS) thereof does not satisfy a target QoS during communication between the base station system and the mobile station system using the overlay or underlay method, the mobile station system requests cooperative transmission from neighboring mobile stations and performs cooperative transmission together with mobile stations that accept the cooperative transmission.

7. The air interface method according to claim 6, wherein the mobile station system is operated such that, if it is determined that the current QoS can satisfy the target QoS without using cooperative transmission during cooperative transmission with the mobile stations that participate in cooperative transmission, the mobile station system releases cooperative transmission with the mobile stations that participate in cooperative transmission.

8. The air interface method according to claim 1, wherein the base station system and the mobile station system communicate with each other using two or more spectrum holes.

9. The air interface method according to claim 8, wherein the base station system configures a single integrated Media Access Control (MAC) frame that supports the two or more spectrum holes.

10. The air interface method according to claim 9, wherein the base station system and the mobile station system transmit the integrated MAC frame and control information through a separately allocated channel.

11. The air interface method according to claim 1, wherein the base station system classifies the spectrum holes into respective classes according to maintenance time and size of the spectrum holes, and allocates a spectrum hole corresponding to a class suitable for characteristics of a service requested by the mobile station system to the mobile station system.

12. The air interface method according to claim 11, wherein the base station system allocates a spectrum hole corresponding to a class suitable for a size of a packet, a period of generation of the packet, and sensitivity to delay for the service requested by the mobile station system.

13. The air interface method according to claim 1, wherein the base station system and the mobile station systems, constituting the cognitive radio-based wireless communication system, share information about use of the spectrum holes and information about schedules with each other.

14. A base station system of a cognitive radio-based wireless communication system, comprising:
    downstream data reception means for receiving downstream data to be transmitted to a mobile station system from a higher layer;
    spectrum hole information collection means for collecting information about spectrum holes from neighboring systems;
    channel state monitoring means for monitoring a channel state and determining whether each spectrum hole is used;
    overlay upstream data reception means for receiving upstream data from the mobile station system using an overlay method;
    underlay upstream data reception means for receiving upstream data from the mobile station system using an underlay method;
    resource allocation means for allocating a spectrum hole to the mobile station system using information about a usable spectrum hole obtained by the channel state monitoring means;
    upstream data transmission means for receiving upstream data from the overlay upstream data reception means when the spectrum hole is allocated to the mobile station system, and for receiving upstream data from the underlay upstream data reception means and transmitting the upstream data to a higher layer when no spectrum hole is allocated to the mobile station system; and
    downstream data transmission means for transmitting the downstream data received from the downstream data reception means to the mobile station system using an overlay method when the spectrum hole is allocated to the mobile station system, and for transmitting the downstream data received from the downstream data reception means to the mobile station system using an underlay method when no spectrum hole is allocated to the mobile station system.

15. The base station system according to claim 14, further comprising spectrum hole classification means for classifying spectrum holes into respective classes according to maintenance time and size of the spectrum holes collected by the spectrum hole information collection means, and transmitting the classified spectrum holes to the resource allocation means,
    wherein the resource allocation means allocates a spectrum hole corresponding to a class suitable for characteristics of a service requested by the mobile station system.

16. The base station system according to claim 14, wherein the resource allocation means allocates two or more spectrum holes to the mobile station system, and
    wherein the base station system further comprises integrated frame configuration means for configuring a single integrated Media Access Control (MAC) frame that supports the two or more spectrum holes allocated by the resource allocation means, and for transmitting the integrated MAC frame to the downstream data transmission means.

17. A mobile station system of a cognitive radio-based wireless communication system, comprising:
    downstream data reception means for receiving downstream data transmitted from a base station system using an overlay or underlay method;
    control information reception means for receiving control information from the base station system;
    upstream data reception means for receiving upstream data to be transmitted to the base station system from a higher layer;
    upstream data transmission means for transmitting the upstream data using the overlay method when a spectrum hole is allocated by the base station system, and for transmitting the upstream data using the underlay method when no spectrum hole is allocated by the base station system;
    data classification means for classifying final destinations for the downstream data received from the downstream data reception means using the control information received from the control information reception means; and
    downstream data transmission means for transmitting the received downstream data to a higher layer when the final destination classified by the data classification means is the mobile station system itself.

18. The mobile station system according to claim 17, further comprising:
relay signal transmission means for transmitting the received downstream data to a neighboring mobile station system when the final destination classified by the data classification means is a neighboring mobile station system; and
relay signal reception means for receiving downstream data, a final destination of which is the mobile station system itself, from the neighboring mobile station system.

19. The mobile station system according to claim 17, further comprising:
Quality of Service (QoS)-related information collection means for collecting QoS-related information;
channel state monitoring means for monitoring a state of radio communication;
cooperative transmission information transmission means for transmitting information related to cooperative transmission to neighboring mobile station systems;
cooperative transmission information reception means for receiving information related to cooperative transmission from the neighboring mobile station systems; and
cooperative transmission information management means for determining whether a target QoS can be satisfied using the QoS-related information, received from the QoS-related information collection means, and information about the radio communication state, received from the channel state monitoring means, requesting cooperative transmission from the neighboring mobile station systems through the cooperative transmission information transmission means if it is determined that the target QoS cannot be satisfied, and performing cooperative transmission using mobile station systems that accepted the cooperative transmission if the cooperative transmission is accepted by the neighboring mobile station systems through the cooperative transmission information reception means.

20. A cognitive radio-based wireless communication system comprising a base station system and a mobile station system, wherein:
the base station system comprises downstream data reception means for receiving downstream data to be transmitted to a mobile station system from a higher layer, spectrum hole information collection means for collecting information about spectrum holes from neighboring systems, channel state monitoring means for monitoring a channel state and determining whether each spectrum hole is used, overlay upstream data reception means for receiving upstream data from the mobile station system using an overlay method, underlay upstream data reception means for receiving upstream data from the mobile station system using an underlay method, resource allocation means for allocating a spectrum hole to the mobile station system using information about a usable spectrum hole obtained by the channel state monitoring means, upstream data transmission means for receiving upstream data from the overlay upstream data reception means when the spectrum hole is allocated to the mobile station system, and for receiving upstream data from the underlay upstream data reception means and transmitting the upstream data to a higher layer when no spectrum hole is allocated to the mobile station system, and downstream data transmission means for transmitting the downstream data received from the downstream data reception means to the mobile station system using an overlay method when the spectrum hole is allocated to the mobile station system, and for transmitting the downstream data received from the downstream data reception means to the mobile station system using an underlay method when no spectrum hole is allocated to the mobile station system, and
the mobile station system comprises downstream data reception means for receiving downstream data transmitted from a base station system using an overlay or underlay method, control information reception means for receiving control information from the base station system, upstream data reception means for receiving upstream data to be transmitted to the base station system from a higher layer, upstream data transmission means for transmitting the upstream data using the overlay method when a spectrum hole is allocated by the base station system, and for transmitting the upstream data using the underlay method when no spectrum hole is allocated by the base station system, data classification means for classifying final destinations for the downstream data received from the downstream data reception means using the control information received from the control information reception means, and downstream data transmission means for transmitting the received downstream data to a higher layer when the final destination classified by the data classification means is the mobile station system itself.

* * * * *